Oct. 31, 1950 L. D. GRIGNON 2,527,633
ELECTRONIC COUNTER
Filed May 14, 1946
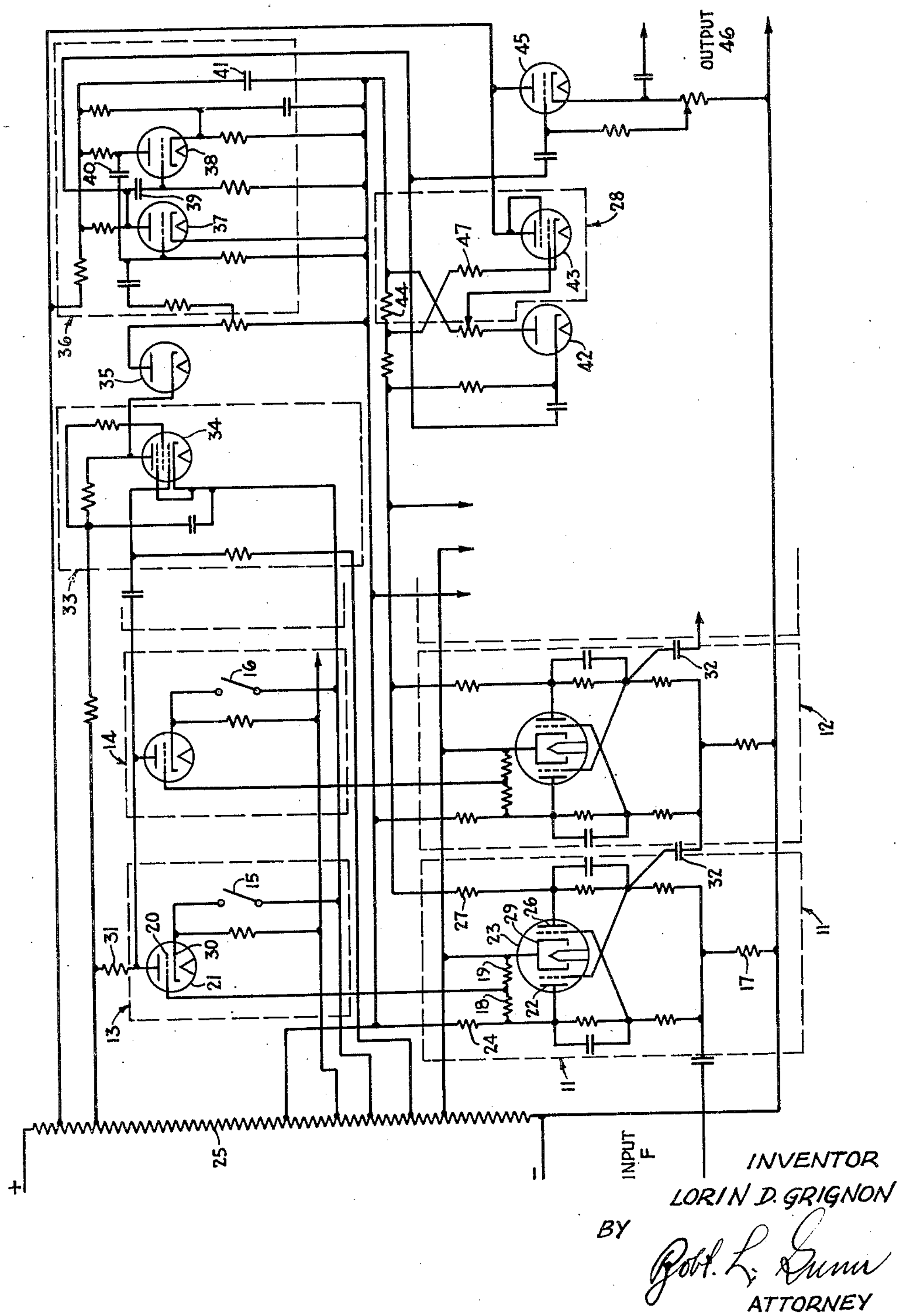
INVENTOR
LORIN D. GRIGNON
BY Robt. L. Dunn
ATTORNEY Patented Oct. 31, 1950 2,527,633

UNITED STATES PATENT OFFICE 2,527,633

ELECTRONIC COUNTER

Lorin David Grignon, Los Angeles, Calif., assignor to Twentieth Century-Fox Film Corporation, Los Angeles, Calif., a corporation of New York Application May 14, 1946, Serial No. 669,540

6 Claims. (Cl. 250—27)

This invention relates to frequency dividing devices and deals particularly with a variable incremental wave transducer whereby an input frequency may be divided into an infinite number of subfrequencies or, in a more tangible sense, a series of events may be accurately counted electrically.

The primary object of the invention to be described hereinafter is to produce an electrical instrument of the character described having means for varying the frequency dividing rate to meet the requirements of variable frequency counting. In addition to frequency changing, the device may be used to mark time by spaced audible clicks, such as a metronome in music, or it may be used to accurately count and register the number of events taking place with respect to time.

For a brief, simple description of the invention, assume that it is desirable to divide an occurring frequency into a subfrequency or to mechanically count a series of pulses or events that are occurring at a given rate or frequency. The frequency desired to be divided or to be counted would be used as an input pulse to my device. After a given number of input events have occurred, say for example 17, then my electronic counter produces an output pulse or some other reaction which is registered either audibly or visibly, thereby notifying of an accumulated total, and is automatically reset to zero before the next input pulse or event occurs and thenceforth repeats the same cycle. In this case each visible or audible signal generated by the device would indicate 17 original pulses or events. If any other number, such as 9, were selected, then the input frequency would be nine times the number of signals received from the instrument.

The above described operation is performed electronically, thereby vastly increasing the rate of operation and providing for the counting of enormous numbers of events resulting from a high frequency rate of occurrence, together with a simple adjustment for varying the rate of counting.

In the drawing, which is a wiring schematic of a device suitable for my purpose, I have shown an electronic instrument having an input frequency F introduced to a series of electronic counting circuits generally designated 11 and 12 which are commonly known as the Scale of Two Trigger Circuits. While I have shown but two counting circuit units, it is to be understood that there may be as many units involved as found necessary to arrive at the required divisor for the frequency used to produce any counting rate or subfrequency sought. In conjunction with the counting circuits, detecting circuits generally designated 13 and 14 having selector switches 15 and 16 respectively are provided for indicating at any instant of time which is the conducting or non-conducting side of each counting circuit. The switches may be combined into a single selective unit for convenience to provide a means for making any combination of the detecting circuits operative or non-operative as desired.

Since the counting circuits are the commonly known scale of two dividers, the output frequency of each successive counting stage is one-half of its input frequency, but by instantaneously viewing the condition of operation of each counting stage by means of the detecting circuits, any consecutive number of input cycles can be measured up to the limit of the counting circuit stages. For example, an eight stage counting circuit divides the input by 256 and by simultaneously viewing all counting stages 255 input cycles can be counted before it is necessary to repeat the cycle. Thus, by properly setting up operating or non-operating conditions in the detecting tubes, a pulse can be obtained at the output of the detecting circuits for any number of successive input pulses from one to twice the scale of the last counting stage less one.

The counting stages designated 11 and 12, as before stated, are simplified versions of the Scale of Two Trigger Circuits and are identical in design. Therefore, for the sake of simplicity, the elements of one unit only will be described at the outset. The input frequency F to the counting system is applied across a resistor 17 of the first unit 11. An additional requirement is that the units operate only on negative input pulses. Added to the circuit of the unit 11 are resistors 18 and 19, the juncture of which is connected to the grid 20 of tube 21 of its associated detecting circuit 13. Unit 11 also includes a double triode tube 23 having a left hand plate 22 supplied by potential through a resistor 24 from a potentiometer 25 connected across a source of supply indicated by plus and minus signs and a right hand plate 26 supplied with potential through a resistor 27 controlled by a reset circuit generally designated 28. The reset circuit will be described later.

It will be noted that the cathodes of the detecting tubes are connected in parallel in their operative position, that is, when the selector switch associated with each tube is closed. The plates of these tubes are also connected in parallel and furnished voltage through a common resistor 31.

Now then, assume that no input pulses are being introduced into the counting circuits and that the initial starting condition for the counting circuits is with conduction in the right hand section of all counting units. Under these conditions the left hand section of each counting circuit will be non-conducting since the left hand grids are depressed negatively to such an extent that the triode section cannot pass current and therefore the positive voltage at that plate is greater than would obtain if that section were conducting. The cathodes of all the counting circuits are held at a constant potential with respect to the supply source. Therefore, the potential at the juncture of resistors 18 and 19 is relatively high positively with respect to the cathode 29 of the counting stage 11. According to my invention, with the selector switch 15 closed, the cathode 30 of the detecting tube 21 is maintained at substantially the same potential as the grid 20 which is connected to the juncture of resistors 18 and 19 which forces that detecting tube to draw a large plate current through the limiting resistor 31. At this same time exactly the same situation exists in the second counting stage and its associated detecting tube, provided that the selector switch 16 of the associated second detecting tube is likewise closed. However, since the plate voltage is already considerably depressed due to the high current being drawn through resistor 31 by tube 21, very little additional plate current can flow in the combined detecting circuits. More exactly, the total plate current is divided between the two circuits 13 and 14 so that the net change in total plate current or change in voltage drop across 31 is small. This is true since the circuit is essentially a constant current circuit. For illustration, assume both selector switches 15 and 16 are closed and that an input frequency is applied to the first counting stage and trace the operation for each input pulse as follows: The first input pulse transfers conduction of the first counting stage 11 from the right hand to the left hand section, which reduces the voltage on the plate 22 due to the increase in current and the consequent voltage drop through its associated plate resistor 24. Therefore, the grid voltage of tube 21 which is dependent on the voltage of plate 22 becomes negative to such an extent that tube 21 ceases to draw plate current. The plate voltage on 21, however, cannot rise appreciably because even though the tube 21 draws no current the second detecting circuit 14 still draws large plate current, since under the conditions above set forth its grid voltage is essentially the same as the cathode voltage and the resistor 31 limits the flow of current. Hence, regardless of the number of detecting tubes drawing current, there is very little change in plate voltage on any of the plates so long as one of the detecting tubes is drawing current. It is only when no tube is drawing current that there is a sudden rise in voltage, which will be later described. The second input pulse transfers conduction in the first counting stage 11 back to the right hand section of that stage, which simultaneously produces a negative input pulse through condenser 32 to the second counting stage 12, thereby transferring conduction of this counting unit from the right hand to the left hand section. With the transfer of conduction from the left hand section to the right hand section of counting stage 11, the grid 20 of tube 21 again becomes sufficiently less negative to permit drawing of plate current of that tube and the grid of the second detecting tube in circuit 14 has gone sufficiently negative, in the same manner as previously described, to cut off the plate current of circuit 14. Therefore, since one tube is drawing current, there is still very little change in the plate voltage of all detecting tubes. The third input pulse again transfers conduction of the first counting stage from the right hand section to the left hand section, making the grid of tube 21 sufficiently negative to cut off the plate current of that tube, and since the second detecting tube of circuit 14 is also cut off because the second input pulse has already transferred the second counting stage to conduction on the left hand side, both detecting tubes have become inoperative and no current flows through the plate coupling resistor 31 of the detecting circuit. Under these conditions, the plate voltage of the detecting circuit immediately rises positively to essentially that of the supply source. This sudden rise in voltage produces a pulse which is amplified and treated to form a signal that is subsequently used to reset the device and also to indicate a total of events.

For further illustration, assume the counting circuits have all been set to zero, that is, all right hand sections conducting and all left hand sections non-conducting, and further assume that the selector switch 15 of circuit 13 is open and the selector switch 16 of circuit 14 is closed. Under the condition of open selector switch 15, the cathode of 13 is returned to a potential such that the variations in voltage which occur on the grid of that tube can never cause it to draw plate current. Therefore, it is inoperative for any condition of the counting circuits. Under the conditions of the assumption, the first detecting tube 21 draws no plate current but the detecting tube of circuit 14 does draw plate current, as described in the first illustration, and again the voltage at the plates of all detecting tubes is depressed negatively from that of the supply source due to the plate coupling resistor 31. To continue, the first input pulse to the first counting stage transfers conduction as explained above, but since 21, the first detecting tube, is inoperative, no change occurs in this detecting circuit. The second input pulse transfers conduction of the first counting stage back to the right hand section of that stage and simultaneously produces an input pulse on the input of the second counting stage, which then transfers conduction to the left hand section of the second stage, as described in the first illustration. As a result, the grid of the tube in circuit 14, the second detecting tube, is depressed negatively and cuts off the plate current of that tube and, since that is the only detecting tube which is drawing plate current, the plate voltage on all detecting tubes immediately rises positively. The third input pulse transfers conduction of the first counting stage from the right to the left hand section, but since 21, the first detecting tube, is inoperative, no change occurs in the detecting circuit.

The two illustrations then indicate in the first case a change in the plate voltage of the detecting circuits for the third input pulse and in the second case for the second input pulse and if we had made the assumption that the selector switch of the first detecting tube was closed and the switch on the second detecting tube was open, then by the same analysis we would have obtained a change in the detecting circuit for each input pulse.

By increasing the number of counting stages with a detecting tube for each stage, plate voltage changes in the detecting circuits can be obtained for any selected number of input pulses up to the limit of the counting stages, which is twice the scale of the last stage minus one.

The plate voltage changes which occur in the detecting circuits are transmitted to an amplifying section 33 having a tube 34 which is set up to operate with a relatively high negative grid voltage so that small detecting circuit plate voltage changes do not appear on the output of this tube, but large changes which occur when all detecting tubes are cut off do appear at its output. The wave shape at the output of 34 for each complete plate voltage change on the detecting circuit will consist of a positive pulse and a negative pulse whose shapes are determined by the time constants of the circuit of section 33. To arrive at a negative pulse from the output of section 33, a tube 35 is connected to the plate of 34 in such a manner as to remove the positive portion of the pulse. The remaining negative pulse is applied to section 36 which is a time delay circuit.

The time delay section is a multi-vibrator circuit comprising tubes 37 and 38 with tube 38 biased to cut-off while 37 draws current. The negative pulse applied to the grid of 37 is of sufficient magnitude to cut off 37, causing a positive rise in the plate voltage of that tube which through a condenser 39 applies a positive voltage to the grid of 38 that causes 38 to draw plate current. Tube 38 will continue to draw plate current as long as its grid remains sufficiently positive, as determined by the time constant of the coupling circuit from the plate of tube 37. As the charge on the coupling condenser 39 is reduced, 38 approaches cut-off. Its plate voltage therefore rises and a positive pulse is transmitted through a condenser 40 to the grid of 37, thus regaining a stable condition until the next negative input pulse to the grid of 37 is received from the detecting circuit amplifier 33 and limiter 35, whereupon the cycle is repeated. Through this action, a positive pulse is obtainable at the plate of 37 of a duration determined by the time constant of section 36, the time delay circuit. The pulse so obtained is further treated and eventually utilized to operate the reset section 28 and also to give the output audible signal or furnish energy to drive a suitable mechanical indicator or counter.

As shown, the plate of 37 is coupled to tube 42 through a condenser 41, the tube 42 being so arranged that it will pass only negative pulses. The purpose of the condenser is to convert the positive square wave pulse on the plate of 37 to two pulses, one positive and one negative on the cathode of 42. Under this setup, tube 42 passes the negative pulse only, which occurs at a time later than the input pulse applied to the grid of 37 by an amount determined by the time constant of section 36.

The output of tube 42 is connected to the grid of tube 43 in the reset section 28 and the resultant negative pulse from 42 is of sufficient magnitude to drive 43 to cut-off. Connected between the positive source of voltage and the right hand sections of all counting stages is a resistance 44 of such value that under normal circumstances the plate voltage available to the right hand sections of the counting stages is sufficiently low to prohibit operation. The resistor 44 works in conjunction with the tube 43 in the following manner: After a series of input pulses have been introduced to the counting circuits and an output pulse obtained, dependent upon the rate of division, the counting circuits will be in some random condition of conduction in right and left hand sections. But for continued operation, the cycle of operation must be repeated indefinitely, which means that all the right hand sections must be conducting and all left hand sections must be non-conducting at the start of each cycle. Tube 43 performs this function.

In accordance with my invention, the reset tube 43 is connected in such a manner that when it draws plate current, the voltage drop through 44 is equal in magnitude and opposite in direction to voltage drops through 44 due to the plate currents of the right hand sections of the counting stages or the load current, thereby to all intents and purposes, so far as voltage is concerned, removing the effect of 44. When the negative input pulse is applied to the grid of 43 from tube 42, its plate current is cut off, causing sufficient voltage drop to appear across 44 to lower the voltage of the plates in the right hand sides of the counting sections, with a consequent transfer of conduction from the left hand sections back to the right hand sections of all counting circuits, thereby setting the counting stages for the next input pulse. Tube 43 is connected across resistor 44 and resistor 47 in such a manner that 43 seeks an equilibration to maintain the voltage drop across 44 nearly constant regardless of load current changes due to random operations of the right hand portions of the counting circuits. All reset conditions must be accomplished in a time less than the interval between successive input pulses, and these requirements are met by the time delay section 36.

The output of the system can be utilized in a number of ways, one of which is shown where tube 45 is connected as an output tube to provide audible signals if desired or to control their functions to meet other requirements. In this case, tube 45 functions similarly to tube 43 in that it operates on the signal put out by the time delay section 36. The output 46 of tube 45 may be connected to a headset for audible registration or it may be amplified and utilized to operate a mechanical indicator or counter if desired. The output pulse of the system may also be used as a synchronizing means for operating a sine wave generator whose output wave may be identical in shape with the input wave and may be any submultiple frequency thereof.

I claim:

1. A device of the character described comprising a plurality of interconnected counting circuits, each of said circuits having two electrical conducting sections, detecting circuits respectively associated with said counting circuits arranged to yield a combined output pulse in response to predetermined changes in the conduction of electricity through the sections of said counting circuits, means for delaying said pulse with respect to time, and a reset circuit under control of said time delayed pulse for influencing the sections of said counting circuits into a predetermined state of conductivity.

2. A device of the character described comprising a plurality of interconnected counting circuits, each of said circuits having two electrical conducting sections, detecting circuits associated with said counting circuits arranged to yield a combined output pulse in response to changes in the conductivity state of the sections in said counting circuits, means for selectively disassociating said detecting circuits from their respective counting circuits to yield a resultant output pulse in response to a predetermined state of conductivity in the sections of said counting circuits, means for delaying said pulse with respect to time, and a reset circuit under control of said time delayed pulse for influencing the sections of said counting circuits into a predetermined state of conductivity.

3. In a device of the character described having a plurality of counting circuits each of said circuits having two electrical conducting sections and a coincident circuit associated with each of said counting circuits, said detecting circuits being arranged to be activated by a predetermined conduction of electricity through their respective counting circuits, a reset circuit for establishing conduction of electricity through one of the sections of said counting circuits, said reset circuit including a resistor in the electrical current supply to said section adapted to prevent conduction of electricity through said section, and a tube arranged to be activated by said detecting circuits for by-passing said resistor to establish predetermined electrical conduction through said section.

4. A device of the character described comprising a plurality of interconnected counting circuits, each of said counting circuits having two electrical conducting sections, detecting circuits associated with said counting circuits arranged to yield a predetermined combined output pulse in response to changes in the conductivity state of the sections of said counting circuits, means for selectively disassociating said detecting circuits from their respective counting circuits to yield a predetermined resultant output pulse in response to the state of conductivity in the sections of said counting circuits, a reset circuit for establishing conduction of electricity through a certain section of each of said counting circuits, said reset circuit including a resistor in the electrical current supply to said certain section adapted to prevent conduction of electricity through said section, and a vacuum tube arranged to be activated by the output pulse of said detecting circuits for permitting current to by-pass said resistor to establish electrical conduction through said certain sections.

5. In a device of the character described having a plurality of counting circuits, each of said circuits having two electrical conducting sections and a detecting circuit associated with each of said counting circuits, said detecting circuits being arranged to be activated by predetermined conduction of electricity through a certain section of their respective counting circuits, means for selectively disassociating said detecting circuits from their respective counting circuits to yield a predetermined resultant output pulse in response to the state of conductivity in the sections of said counting circuits, means for delaying said pulse with respect to time, a reset circuit for establishing conduction of electricity through certain sections of said counting circuits, said reset circuit including a resistor in the electrical current supply to said certain sections adapted to prevent conduction of electricity through said sections and a vacuum tube arranged to be activated by the output from said detecting circuits for by-passing said resistor to establish predetermined electrical conduction through said certain sections.

6. In a device of the character described having a plurality of counting circuits, each of said counting circuits having two electrical conducting sections and a detecting circuit associated with each of said counting circuits, said detecting circuits being arranged to be activated by a predetermined conduction of electricity through a certain section of their respective counting circuits, means for selectively disassociating said detecting circuits from their respective counting circuits to yield a predetermined resultant output pulse in response to the conduction of electricity through certain sections of said counting circuits, means for delaying said pulse with respect to time, a reset circuit for establishing conduction of electricity through said certain sections of said counting circuits, said reset circuit including a resistor in the electrical current supply to said certain sections adapted to prevent conduction of electricity through said sections and a vacuum tube arranged to be activated by the output pulse from said detecting circuits for by-passing said resistor to establish electrical conduction through said certain sections.

LORIN DAVID GRIGNON.

REFERENCES CITED

The following references are of record in the file of this patent:

UNITED STATES PATENTS

| Number | Name | Date |
|---|---|---|
| 2,272,070 | Reeves | Feb. 3, 1942 |
| 2,373,134 | Massonneali | Apr. 10, 1945 |
| 2,381,920 | Miller | Aug. 14, 1945 |
| 2,403,873 | Mumma | July 9, 1946 |
| 2,405,664 | Mumma | Aug. 13, 1946 |
| 2,409,229 | Smith, Jr., et al. | Oct. 15, 1946 |
| 2,410,156 | Flory | Oct. 29, 1946 |
| 2,411,648 | Brauer, et al. | Nov. 26, 1946 |
| 2,422,698 | Miller | June 24, 1947 |

FOREIGN PATENTS

| Number | Country | Date |
|---|---|---|
| 355,705 | Great Britain | Aug. 24, 1931 |

OTHER REFERENCES

Nature, vol. 125, No. 3156, April 26, 1930. Method of Registering . . . Counters, by Rossi, page 636. Copy in Scientific Library.

Electronics, June, 1944. A Four Tube Counter Decade, by John T. Potter, pages 110–113, 358, 360. Copy in Division 10.